Patented Apr. 20, 1926.

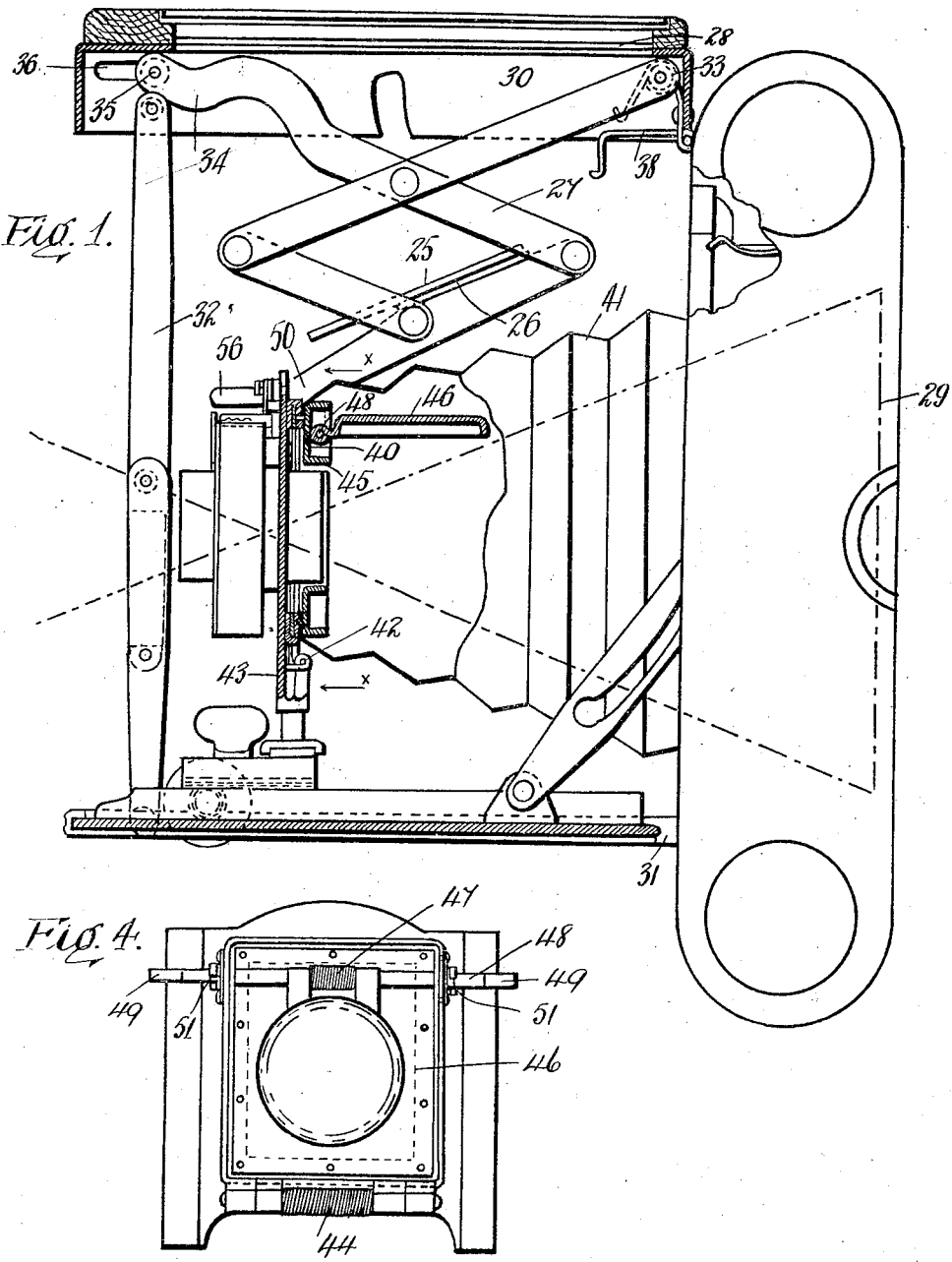

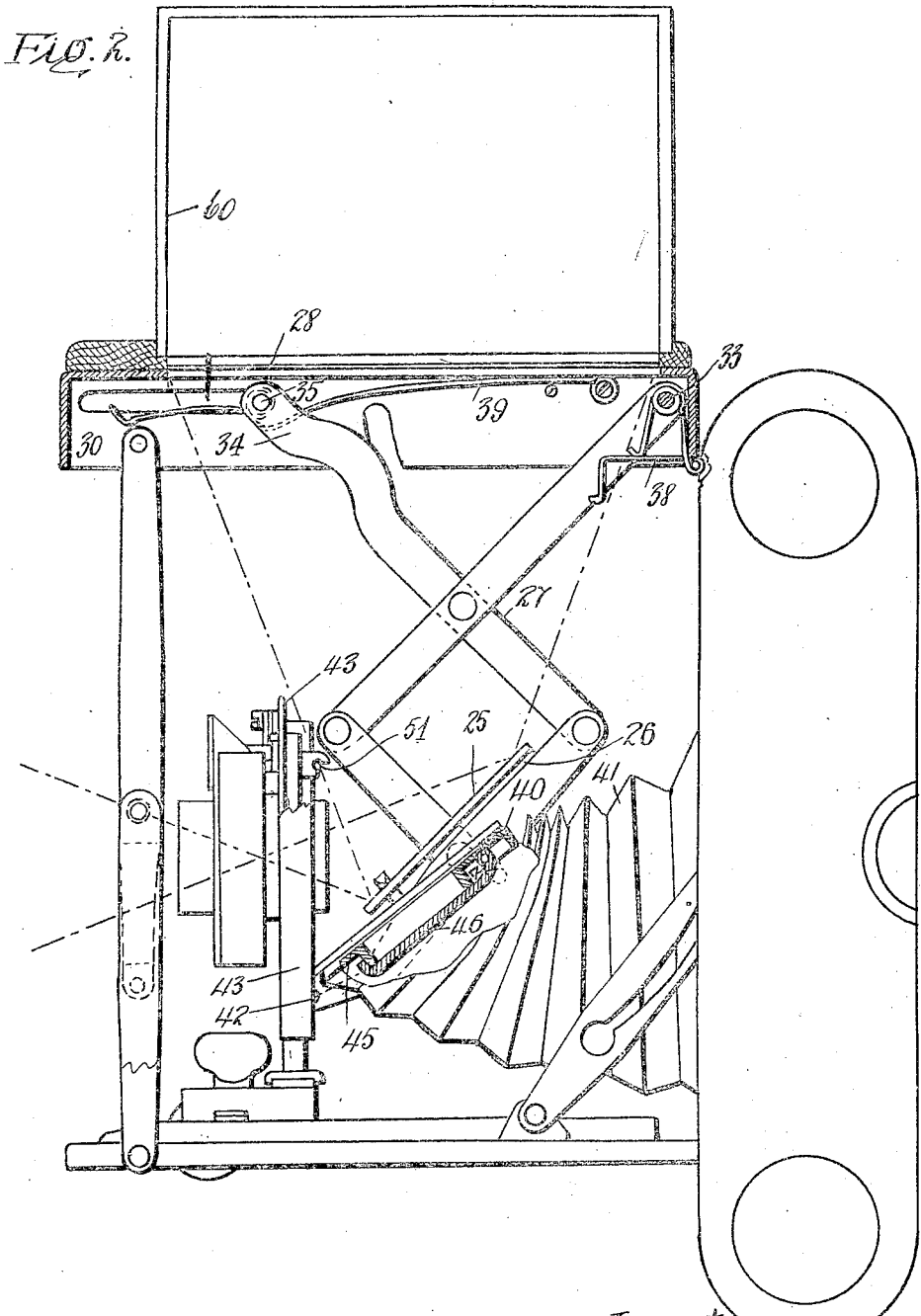

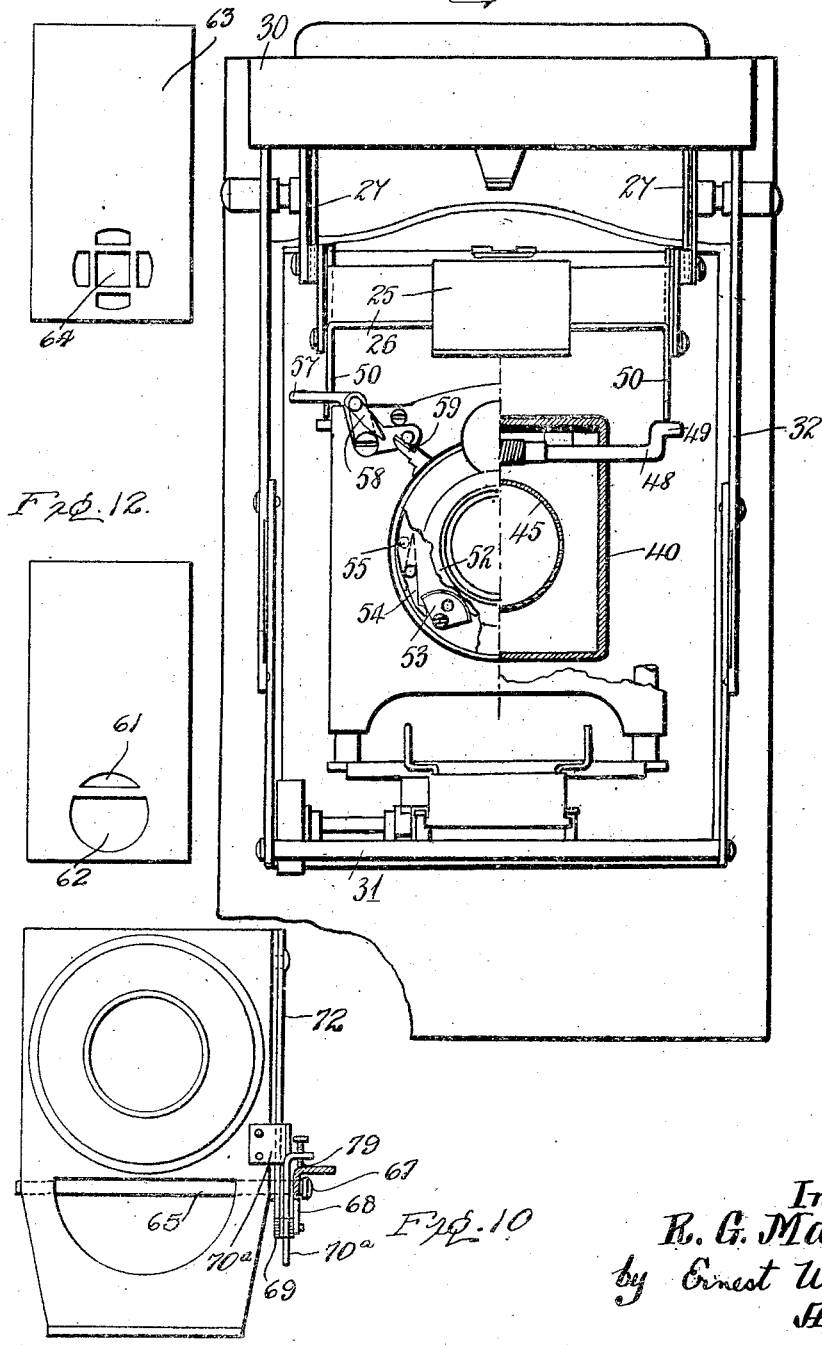

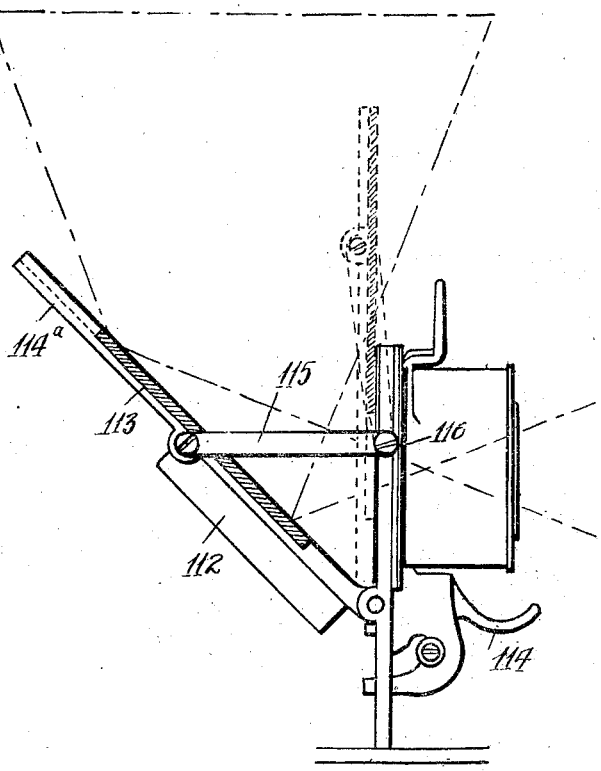
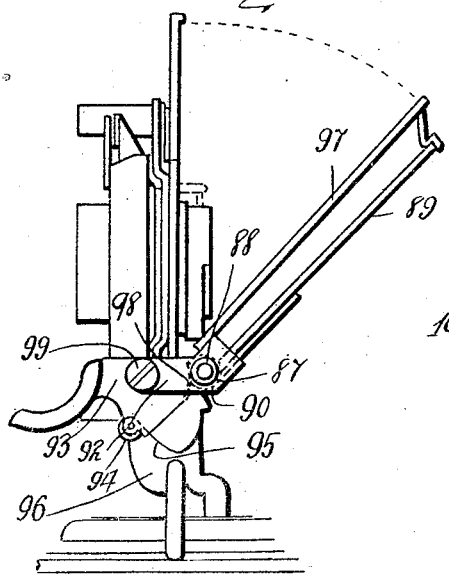
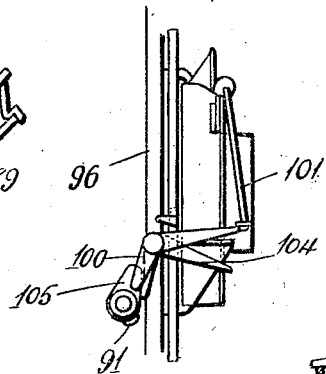

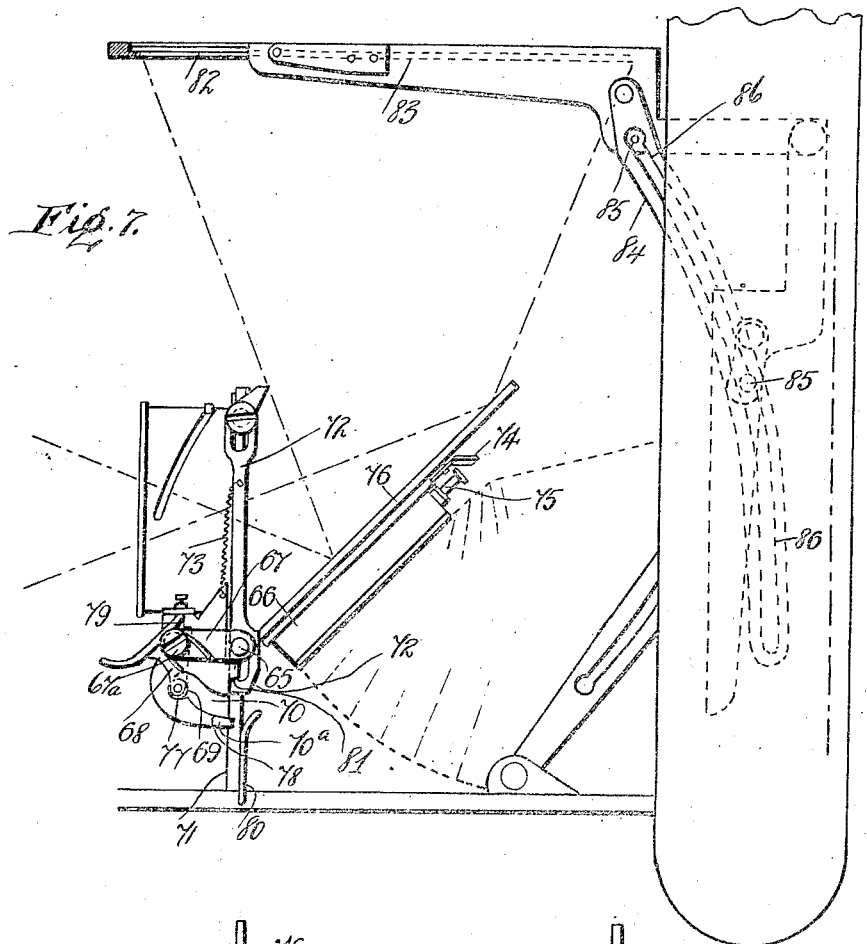
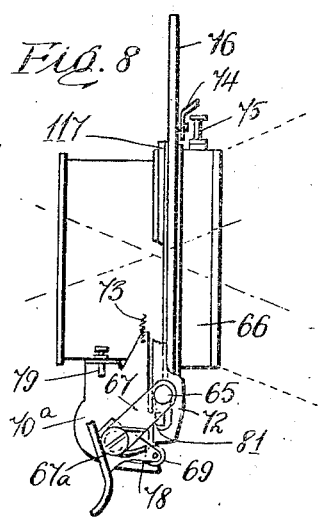
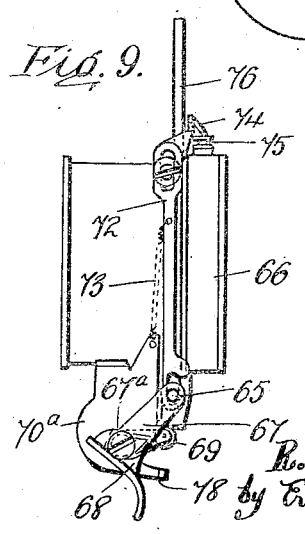

1,581,853

UNITED STATES PATENT OFFICE.

RICHARD GEORGE MATHEWS, OF LONDON, ENGLAND.

REFLEX CAMERA.

Application filed December 6, 1923. Serial No. 678,943.

*To all whom it may concern:*

Be it known that I, RICHARD GEORGE MATHEWS, a subject of the King of Great Britain, residing at London, England, have invented certain new and useful Improvements in and Relating to Reflex Cameras, of which the following is a specification.

The present invention relates to improvements in and relating to reflex cameras of the kind having a folding baseboard and a lens front connected to the camera back by collapsible bellows and supported by the baseboard when the camera is opened and extended for use.

The present invention is directed to improvements in reflex cameras of the kind set out in my prior application Serial No. 584,780 filed the 18th of August 1922. In constructions set out in the aforesaid prior application the bellows nose is attached to the camera front by a slide guide attachment so as to leave the lens and the bellows nose capable of relative sliding movement to or away from each other to line the lens and bellows for exposure or to allow a reflector to be presented close up to the lens to receive and reflect the image to the focussing screen. Further in these constructions the reflector is in the nature of an external fitting.

Now according to the present invention the bellows nose is attached to the camera front by a pivot or hinge joint so that although relative movement of the bellows nose and the camera front is allowed a coupling between the two parts is always maintained. This form of attachment also allows of the reflector being placed inside the bellows.

The present improvements aim at promoting steadiness, stability, manufacturing facilities, and ease and comfort in use. Further it is of great importance to be able to keep the camera steady during exposure to which end, the present improvements aim to minimize as far as practicable, any vibration or jar by the commencement and cessation of the motion of the moving parts.

Preferably movement of, for example, the bellows nose into focussing or exposing position is accompanied by a simultaneous movement of the reflector into the corresponding position.

In order that the invention may be readily understood and carried into practical effect reference is hereby made to the accompanying drawings which show by way of example various constructional forms of cameras by which the present invention can be carried into practical effect.

Figs. 1 and 2 are side views of a construction of camera embodying the present invention, while Fig. 3 is a front view thereof partly in section and Fig. 4 an elevation of the bellows front looking in the direction indicated by the arrow X in Fig. 1.

Figs. 5 and 6 are views of a further variant construction.

Figs. 7, 8, 9 and 10 are views of a further variant construction.

Figs. 11 and 12 are examples of two forms of fenestrated mirrors, while, Fig. 13 is a view of a further variant form of construction embodying the present invention, and Fig. 14 is a detail view related to Figs. 5 and 6.

Referring to the construction shewn by Figs. 1, 12, 13 and 14, a mirror 25 is mounted on a platform 26 which bridges the advancing and retiring end of two parallel lazy tongs 27 or equivalent expanding device by which the mirror 25 is positioned so as to cast the light upwards on a focussing screen 28: the focussing screen 28 being adjusted to identity of focus with the sensitive surface 29.

The expanding device 27 may be mounted to close with the mirror 25 within a box-like hinged door 30 on the front of the camera, this box-like hinged door 30 carrying the focussing screen 28 and when shut, closing over the usual fall-down lens and bellows platform 31 of a standard hand camera, and when open being supported from the lens, etc., platform above the bellows such as by two parallel folding linkages 32, each locking together in the open position, and folding away for compact stowage.

Actuation of the lazy tongs 27 is by approach and recession of the lever ends mounted in the box-like cover 30, each system, by preference, having one such lever end 33 pivotally fixed and the other 34 slidably mounted as by pin and slot movement 35 and 36 for advancing or retiring the mirror by displacement of projecting finger pins 37 in the plane of the box-like cover 30.

Recession of the mirror 25 may be assisted by spring action, a mouse trap spring 38 serving well, and the lazy tongs may be locked in the open and closed position such as by blade or wire springs 39 appropriately shaped to snap into locking relationship with the slot engaging pins 35 and permit the pins to slip thereby if sufficient force is applied.

The small end 40 of the bellows 41 is hinged at 42 to the lens frame 43 so as to be capable of folding backwards from the lens and permit the mirror to be positioned for casting the light on the focussing screen. The small end 40 of the bellows may be under the influence of a spring, such as a mouse trap spring 44, normally tending to close it.

The opening 45 in the bellows front 40 is provided with a hinged cap 46 inside the bellows under spring action, such as a mouse trap spring action 47, normally tending to open the cap 46. The hinging axis 48 of this cap 46 is cranked at each end and with these cranks 49 co-operate extended limbs 50 on the lazy tongs 27 as these advance so that the first step in the cycle of operations is the capping of the bellows front by turning the cranks 49.

In doing this half round local portions of the hinging axis 48 of the cap, are turned to release position with respect to co-operating locking notches 51 on the lens frame 43 and the bellows front 40 is pushed back with the further advance of the lazy tongs 27 to bring the mirror 25 into functioning position as shewn by Fig. 2.

If a between lens shutter is employed as illustrated, this must be opened before the mirror can function.

One way of doing this is illustrated more particularly in Fig. 3.

Employing a known between lens compound iris and sector shutter 52 in which a sector weight 53 is interrelated with the shutter sectors, the normal position of the sector weight 53 corresponds to the closed position of the shutter.

Round the shutter housing is mounted a spring urged lever 54 normally tending to move the sector weight 53 to open the shutter 52, but normally opposing that tendency is a wedge or intruding member 55 of the bellows front 40. As soon however as the bellows nose 40 is strained back, the wedge or intruding member 55 is withdrawn and the spring urged lever 54 moves the sector weight 53 to open the shutter. During the return of the bellows nose to its normal position the wedge 55 returns the spring urged lever 54 to first position and thus allows the shutter to close before the return movement of the cap 46 takes place.

As previously stated the expanding device 27 may fold up within the box-like cover 30, although when the camera is in use this movement may not be entirely carried through, but only a movement effected which is sufficient to operate the shutter trigger for exposure.

During the advance of the lazy tongs 27 a toe 56 on one side trips by a lever or like 57, but on the recession of the lazy tongs actuates that lever 57 to operate through appropriate connexions 58, the shutter trigger 59 for exposure.

Time for exposure may be variously arranged. As one example the lever 57 may be arranged to be moved out of the path of the toe 56.

Focussing may be by the usual racking in and out of the lens panel or extension frame of the camera, the bellows nose being free to move therewith without disturbing the mirror.

Any convenient hooding as for example as indicated by 60 for shielding the focussing screen from extraneous light may be adopted.

In other constructions embodying the present invention the small end of the conical bellows is hinged to the lens frame so as to be capable of folding backwards from the lens and permit a mirror in or on the bellows front to be thereby positioned for casting the image produced by the lens onto a focussing screen: the focussing screen being adjusted to identity of focus with the sensitive surface.

Figs. 11 and 12 shew by way of example two forms of metal mirrors, the mirror in Fig. 12 having a fenestration 61 and a reflecting rib 62 and the mirror 63 shewn in Fig. 11 having a grid like partially light reflecting and partially light transmitting area 64.

Figs. 7, 8, 9 and 10 illustrate a form of construction embodying a conical bellows hinged to the lens frame and in which the beam passes through the mirror to the sensitive surface.

On one end of the hinging axis 65 of the bellows front 66 and fast with that axis is an arm 67 to the outer end of which is pivoted at 67ᵃ a finger trigger lever 68 which has a lateral roller 69 which rides on an edge guide or guide way 70 in a plate 70ᵃ carried by the lens frame 71, this edge guide functioning to hold the lever in position for returning the bellows front 66 to normal position and terminating at such a point as will allow the lever 68 to have a further movement on its pivot axis 67ᵃ to cause the lateral roller 69 to act as a lifting device to raise a vertical slide piece 72 with spring return 73 mounted on a side of the lens front 71 to release the shutter through appropriate connections 74 and 75 and give an exposure. A stop 81 is provided on the plate 70ᵃ to limit the further movement of the trigger lever 68, the roller 69 contacting with said stop 81 at the end of the desired further movement.

For positively retaining the bellows front 66 and mirror 76 at the correct focussing position, means for locking the bellows front 66 in that position may conveniently and advantageously comprise the covered guide way 70 for the lateral roller 69 of the trigger lever 68 with a side recess 77 at the forward and closed end of the guide way 70 which is entered by the roller 69 at the limit of the downward travel to focussing position of the bellows front 66 to thereby lock this in that position. In this case there is no abutment of the lever against the boss of the arm fast on the axis of the bellows front, the covering edge 78 of the guide 70 taking over the function of the abutment.

To determine that the focussing mirror shall be brought definitely each and every time to focussing position, a stop control 79 of the trigger lever 68 is provided and this stop control will apply both in the case of the mechanism with the abutment and in the case of the mechanism with the locking recess.

To co-operate with the finger trigger lever 68, and facilitate the movement thereof, there is provided a thumb hold 80 fixed to the lens panel or front 71.

The focussing screen 82 may as shown be embodied as a separate unit of the camera outfit and be adapted to be received in runners 83 capable of folding into position when the camera is open, the runners 83 being supported on sliding links 84 which are guided for movement by pins 85 working in slots 86 in the aforesaid links 84, the dotted position of the runners and links shewn in Fig. 17 indicating their position when folded down to lie within the camera body.

Figs. 5, 6 and 14 illustrate another variant form of construction.

In this variant in lieu of passing the image through the mirror, or sliding the mirror out of the path of the beam, the mirror is arranged to be folded down out of the path of the beam, the mirror being inside the bellows, and in this case the shutter may conveniently be a between lens shutter, the folding down of the mirror taking place when the hinged bellows front is brought to its normal position against the lens frame.

This may be done through the mediation of a quadrant gearing and a finger trigger lever somewhat similar to the finger trigger lever hereinbefore described.

In the constructional form shewn, the folding bellows front is mounted on a tubular axis 87, through which passes a spindle 88 on which the mirror 89 is mounted, the mirror being inside the bellows. On one projecting end of the spindle is a gear 90, and on the other projecting end of the spindle is a cam 91. On an end of the tubular axis 87 corresponding to the gear end of the mirror spindle is an arm 92 to the outer end of which is pivoted a finger trigger lever 93 which has lateral roller 94 that rides on an edge guide 95 carried by a side of the lens frame 96, this guide 95 functioning as before described to hold the lever 93 and the arm 92 in fixed relationship for moving the bellows front 97 to and from normal position.

On the trigger lever 93 is a quadrant gear 98 which meshes with the mirror spindle gear 90, and while the lateral roller 94 of the trigger lever 93 is riding on the edge guide 95, the quadrant gear 98 and the mirror spindle gear 90 are in locked relationship, but the edge guide 95 terminates at a point allowing the trigger lever 93 to have a further or first movement on its axis 99 to cause the quadrant gear 98 to turn the gear 90 on the mirror spindle 88 and fold the mirror 89 out of or into the path of the beam, according as the bellows front 97 is being moved to or from normal position.

The mirror bellows front 97 and lens frame 96 are arranged to make light tight connection in the normal position of the bellows front against the lens frame.

At the moment that the mirror 89 has passed out of the path of the beam or quickly thereafter, the cam 91 on the other end of the mirror spindle 88 operates one arm of a bell crank lever 100 pivoted on the lens frame 96, the other arm of which trips a rod or arm 101 for releasing the shutter.

Referring to the diagrammatic view, Fig. 14, a known between lens compound iris and sector shutter in which a sector weight 102 is interrelated with the shutter sectors, and the normal position of the sector weight corresponds to the closed position of the shutter serves well.

Round the shutter housing is mounted a spring urged bell crank lever 103 normally tending to move the sector weight to open the shutter, but normally opposing that tendency is a further bell crank lever 104 (see Fig. 6) pivoted on the lens frame and under the control of a cam 105 on the tubular axis of the bellows front.

When the bellows nose is to be strained back by a forward movement of the trigger lever 93, the mirror is first brought by the quadrant gear 98 into light tight relationship with the bellows front 97 and the aforesaid cam 105 on the tubular axis 87 of the bellows front, actuates the further bell crank lever 104 to move the sector weight 102 to open the shutter, while the concluding part of the forward movement of the trigger lever 93 positions the bellows front 97 with its mirror 89 in the correct position for focussing.

The bell crank levers 104 and 100 are under spring or other control for return to their normal positions after release from the cams 105 and 91 respectively.

Like or similar means to that hereinbefore described may be adopted for locking the bellows front and mirror in the correct focussing position.

Conveniently and advantageously the focussing may be effected through the mediation of a helical focussing mount, in which case the arm of each bell crank which actuates the shutter lever or the further bell crank lever is prolonged so as to always remain in co-operating relationship therewith in any position of the lens front.

The mirror may be divided so that an upper portion is fixed to the bellows front and only the lower portion folds or otherwise moves into and out of the path of the beam.

Fig. 13 is a diagrammatic view of a further variant wherein the mirror is moved out of the path of the beam during the return of the bellows nose to normal position. As illustrated the hinged bellows nose 112 and mirror 113 are shown folded back from the lens panel positioned for reflecting the image to the focussing screen.

A finger trigger device 114 similar to that hereinbefore referred to moves the bellows nose to and from the lens panel. This movement of the bellows nose is accompanied by a movement of the mirror 113 out of or into the path of the beam.

The mirror 113 is slidably mounted in a panel 114ª on the bellows nose 112 and is controlled for movement by a link 115 pivoted at 116 to the lens panel, so that by virtue of the different pivot centres of the bellows nose and the mirror, the mirror on a movement of the bellows nose towards the lens panel is not only carried by the bellows nose toward the lens panel but at the same time by the link 115 is made to slide up the bellows nose panel 114ª so that when the bellows nose is brought into light tight relationship with the lens panel the mirror has been moved out of the path of the beam as indicated by dotted outlines in Fig. 13. The shutter in this variant is located in the bellows nose behind the mirror. Means similar to those hereinbefore described in relation to Fig. 7 may be provided to touch off the shutter release after the bellows nose has been returned to normal position.

With all the arrangements hereinbefore referred to any convenient hooding for shielding the focussing screen from extraneous light may be adopted. For example, a suitable hood may be provided for excluding extraneous light from below the focussing screen, and the focussing screen may be provided above with an appropriate viewing hood, both hoods being collapsible for compact stowage.

In cases where the beam is to pass through the mirror, a sector shutter located behind the mirror and mounted on the hinged front of the bellows so as to move therewith serves well. With a sliding mirror or other like or similar bellows capping device, a between lens shutter will serve with advantage as regards compactness.

In all cases the usual iris diaphragm or like device may be situated in a between lens position of the lens with appropriate external adjustment such as, for example, by a rotating ring at the front of the lens mount.

Focussing adjustment may be by a helical mounting of the lens, but any other appropriate lens focussing mount may be adopted.

The mirror or the rigid focussing screen may be made to fold on itself for greater compactness. In the term rigid focussing screen a screen of flexible material stretched in a rigid frame is to be regarded as included, and two such frames jointed to fold one on the other as an example of a rigid folding screen.

The bellows front or nose and the lens frame are arranged to make light tight connection in the normal position of the bellows front. For example the lens frame may have a velvet facing as indicated by 117 in Fig. 8.

What I claim is:—

1. In a reflex camera of the class described, comprising collapsible bellows, a lens front, a shutter, a focussing screen, and a small reflector, a pivot joint connecting said bellows nose and said lens front so that the front and the bellows nose are capable of a relative swinging movement to or away from each other to line the lens and bellows for exposure or to relate a small reflector close up to the lens for focussing and a coupling between the two parts is always maintained, substantially as described.

2. A camera as claimed in claim 1 hereof, in which the relative movement of the bellows nose and the lens and the movement of the reflector to the corresponding position are simultaneously effected, substantially as described.

3. A camera as claimed in claim 1 hereof, having means whereby on the movement to relate the reflector to the lens the shutter mechanism is released for automatic opening thereof and on the return movement the shutter mechanism is closed before the lens and bellows are returned to normal position.

4. A camera of the class described, comprising in combination collapsible bellows, a lens front, a shutter a focussing screen and a small reflector, a pivot joint connecting said bellows nose and said lens front so that the front and the bellows nose are capable of a relative swinging movement to or away from each other for the purpose described, and means whereby on the movement to relate the reflector to the lens the shutter mechanism is released for automatic opening thereof and on the return movement the shutter mechanism is closed before the lens and bellows are returned to normal position, said relative movement of the nose and lens and the movement of the reflector to the corresponding position being simultaneously effected.

5. In a camera as claimed in claim 1 hereof, means for closing the bellows nose before the movement to relate the reflector to the lens takes place.

6. In a camera as claimed in claim 4 hereof, means for closing the bellows nose before the movement to relate the reflector to the lens takes place.

7. In a camera as claimed in claim 1 hereof, contact devices by which the bellows nose may release the shutter whether for closing or for full cycle of opening or closing, the said shutter being on the co-axial line or the approximate co-axial line of the lens and bellows or otherwise cutting across such line substantially as described.

8. In a camera as claimed in claim 1 hereof, a focussing screen of flexible material in roller blind form, mounted with folding, racking, and adjusting devices substantially as described.

9. A reflex camera of the class described, comprising collapsible bellows, a lens front, a shutter, a focussing screen, a small reflector, and a pivot joint connecting the nose of said bellows to said lens front, said bellows nose folding backwards from the lens and permitting the reflector to be positioned for casting the light on the focussing screen.

10. A camera as claimed in claim 9 hereof, with spring action normally tending to close said bellows nose.

11. A reflex camera of the class described comprising collapsible bellows, a lens front, a shutter, a focussing screen, a pivot joint connecting the nose of said bellows to the lens front and a reflector carried by said bellows nose, so that when said bellows nose is folded backwards from the lens, the reflector is related to the lens for casting the light on to said focussing screen.

12. A reflex camera of the class described comprising collapsible bellows, a lens front, a shutter, a focussing screen, a pivot joint connecting the nose of said bellows to the lens front, a sliding reflector carried by said bellows nose, and means for moving said reflector into focussing position when said bellows nose is folded backwards and moving said reflector out of the path of the beam during the return of said bellows nose to taking position.

13. The combination with a camera as claimed in claim 11 hereof of a finger trigger actuating device.

14. The combination with a camera as claimed in claim 12 hereof of a finger trigger actuating device.

15. The combination with a camera as claimed in claim 11 hereof, of a reflector constructed to slide in the bellows nose and means so that after the bellows nose has been brought into light tight relationship with the lens panel, the reflector can be slid out of the path of the beam.

16. A camera as claimed in claim 11 hereof, having a shutter located in the bellows nose behind the reflector.

17. The combination with a camera as claimed in claim 11 hereof, of a finger trigger device on the hinging axis of the bellows nose by which the bellows nose is moved to and away from the lens panel, an arcuate edge guide carried by the lens panel for guiding said finger trigger lever, said device being so arranged as to allow the lever when returning the bellows nose to normal position to have a further movement on its pivot axis so as to co-operate with a slide with spring return mounted on the lens panel to touch off a shutter release, substantially as described.

18. The combination with a camera as claimed in claim 12 hereof, of a finger trigger device on the hinging axis of the bellows nose by which the bellows nose is moved to and away from the lens panel, an arcuate edge guide carried by the lens panel for guiding said finger trigger lever, said device being so arranged as to allow the lever when returning the bellows nose to normal position to have a further movement on its pivot axis so as to co-operate with a slide with spring return mounted on the lens panel to touch off a shutter release, substantially as described.

19. In a camera as claimed in claim 11 hereof, a covered guideway for the trigger lever with a recess at the forward and closed end of the guideway in which the trigger lever is adapted to lock at the limit of the downward travel to focussing position of the bellows front.

20. In a camera as claimed in claim 11 hereof, a covered guideway for the trigger lever with a recess at the forward and closed end of the guideway in which the trigger lever is adapted to lock at the limit of the downward travel to focussing position of the bellows front.

21. In a camera as claimed in claim 12 hereof, a covered guideway for the trigger lever with a recess at the forward and closed end of the guideway in which the trigger lever is adapted to lock at the limit of the downward travel to focussing position of the bellows front.

22. A reflex camera of the class described comprising collapsible bellows, a lens front, a shutter, a focussing screen, folding slide runners for receiving said focussing screen, a pivot joint connecting the nose of said bellows to the lens front, and a reflector carried by said bellows nose so that when said bellows nose is folded backwards from the lens, the reflector is related to the lens for casting the light on to said focussing screen, substantially as described.

23. A reflex camera of the class described comprising collapsible bellows, a lens front, a shutter, a focussing screen, folding slide runners for receiving said focussing screen, a pivot joint connecting the nose of said bellows to the lens front, a sliding reflector carried by said bellows nose, and means for moving said reflector into focussing position when said bellows nose is folded backwards and moving said reflector out of the path of the beam during the return of said bellows nose to taking position.

24. A reflex camera of the class described comprising collapsible bellows, a lens front, a shutter, a focussing screen, folding slide runners for receiving said focussing screen, a pivot joint connecting the nose of said bellows to the lens front, a sliding reflector carried by said bellows nose, means for moving said reflector into and out of focussing position on reverse movements of the bellows nose, and a trigger actuating device for moving said bellows nose.

25. A reflex camera of the class described comprising collapsible bellows, a lens front, a shutter, a focussing screen, folding slide runners for receiving said focussing screen, a pivot joint connecting the nose of said bellows to the lens front, a sliding reflector carried by said bellows nose, means for moving said reflector into and out of focussing position on reverse movements of the bellows nose, and a trigger actuating device for moving said bellows nose, said trigger actuating device also actuating a shutter release.

26. A reflex camera of the class described comprising collapsible bellows, a lens front, a shutter, a focussing screen, folding slide runners for receiving said focussing screen, a pivot joint connecting the nose of said bellows to the lens front, a sliding reflector carried by said bellows nose, means for moving said reflector into and out of focussing position on reverse movements of the bellows nose, a trigger actuating device for moving said bellows nose, and means for locking the bellows nose in correct focussing position.

In testimony whereof, I affix my signature.

RICHARD GEORGE MATHEWS.